No. 708,864. Patented Sept. 9, 1902.
W. E. CARMONT.
RESILIENT TIRE FOR VEHICLE WHEELS.
(Application filed Mar. 10, 1902.)
(No Model.) 4 Sheets—Sheet 1.
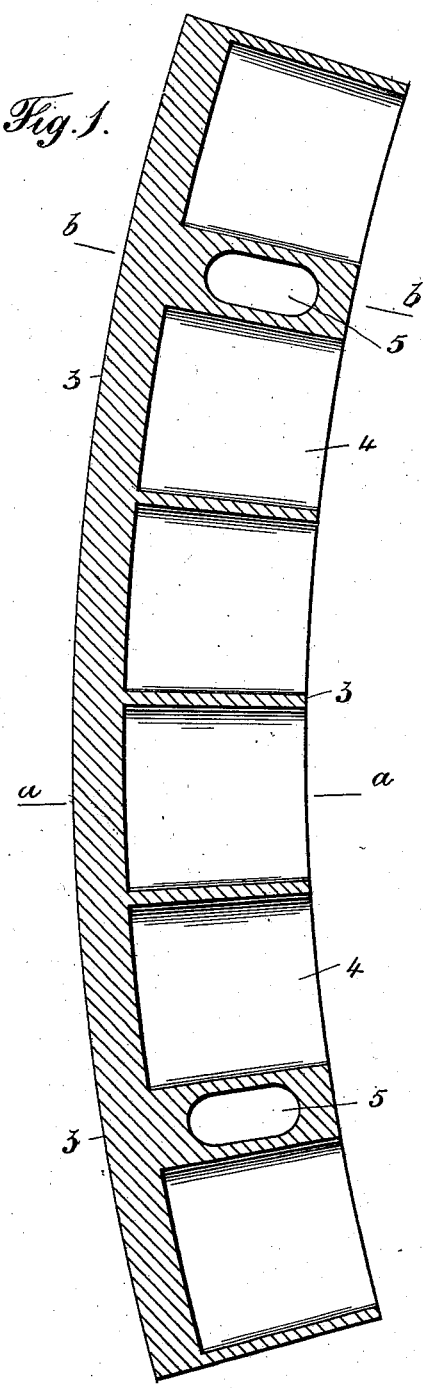
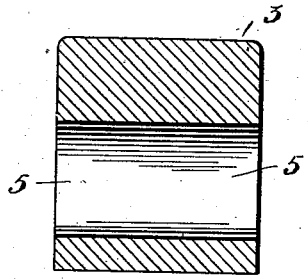
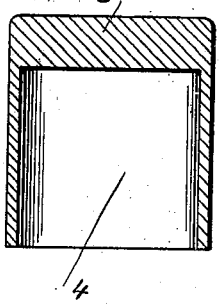
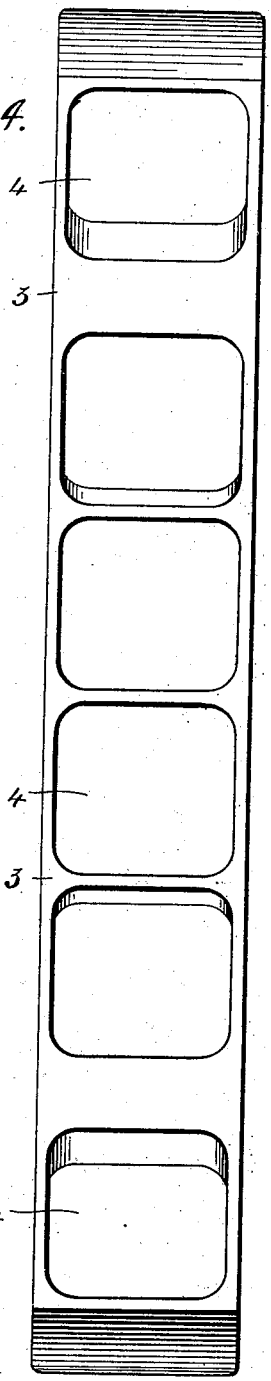
Witnesses: Inventor
William E. Carmont No. 708,864. Patented Sept. 9, 1902.
W. E. CARMONT.
RESILIENT TIRE FOR VEHICLE WHEELS.
(Application filed Mar. 10, 1902.)
(No Model.) 4 Sheets—Sheet 2.

Witnesses:

Inventor
William E. Carmont
By James L. Norris
Atty

No. 708,864. Patented Sept. 9, 1902.
W. E. CARMONT.
RESILIENT TIRE FOR VEHICLE WHEELS.
(Application filed Mar. 10, 1902.)
(No Model.) 4 Sheets—Sheet 3.
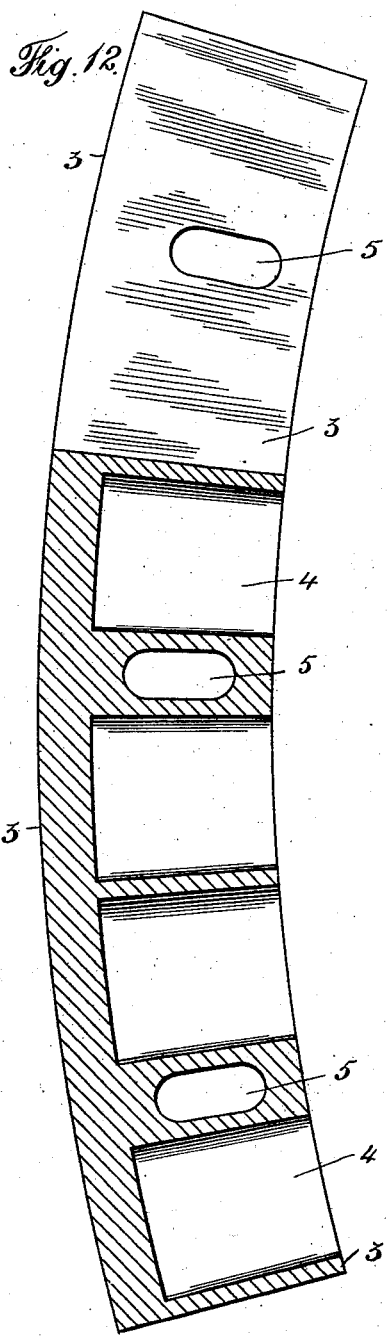
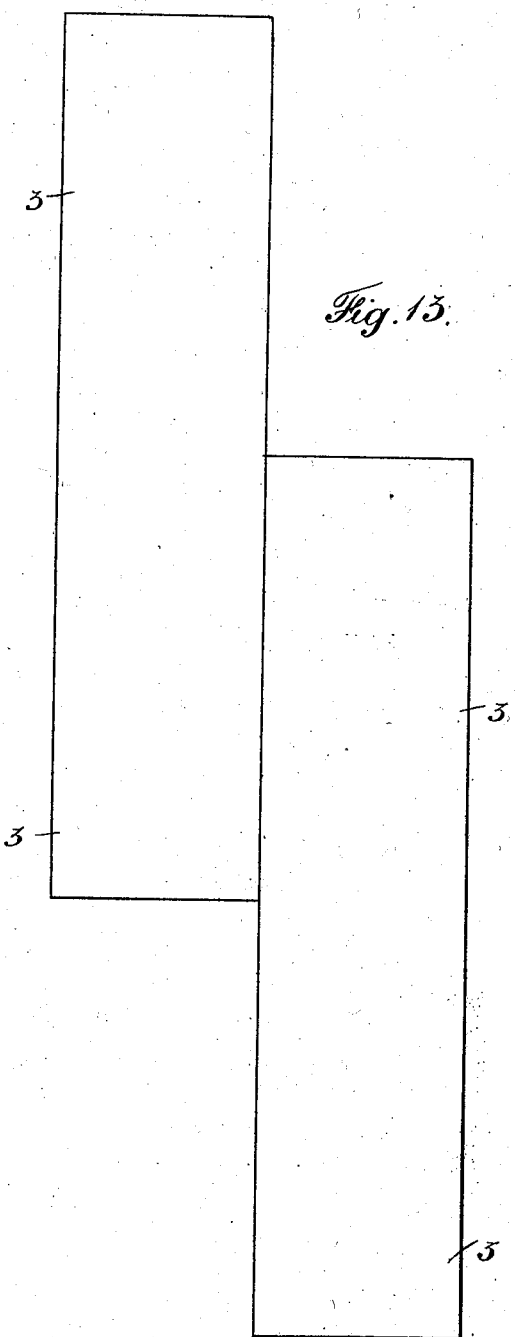
Witnesses:
Inventor
William E. Carmont
By James L. Norris
Atty
THE NORRIS PETERS CO., PHOTO-LITHO., WASHINGTON, D. C.

No. 708,864. Patented Sept. 9, 1902.
W. E. CARMONT.
RESILIENT TIRE FOR VEHICLE WHEELS.
(Application filed Mar. 10, 1902.)

(No Model.) 4 Sheets—Sheet 4.

Witnesses:

Inventor
William E. Carmont
By James L. Norris.
Atty

THE NORRIS PETERS CO., PHOTO-LITHO., WASHINGTON, D. C.

UNITED STATES PATENT OFFICE.

WILLIAM EDWARD CARMONT, OF KINGSTON-UPON-THAMES, ENGLAND.

RESILIENT TIRE FOR VEHICLE-WHEELS.

SPECIFICATION forming part of Letters Patent No. 708,864, dated September 9, 1902.

Application filed March 10, 1902. Serial No. 97,546. (No model.)

*To all whom it may concern:*

Be it known that I, WILLIAM EDWARD CARMONT, a subject of the King of Great Britain, residing at Helmsdale, Kingston-upon-Thames, Surrey, England, have invented certain new and useful Improvements in Resilient Tires for Wheels of Road-Vehicles, of which the following is a specification.

The object of my invention is improvements connected with resilient tires for wheels of road-vehicles, whereby such wheels are noiseless in motion, have greater wear, and the tires can be made of size and strength to suit all classes of vehicles.

My invention will be more particularly understood from the following description, aided by the accompanying drawings, in which—

Figure 9:
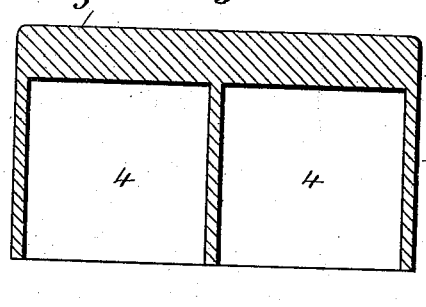
Figure 10:
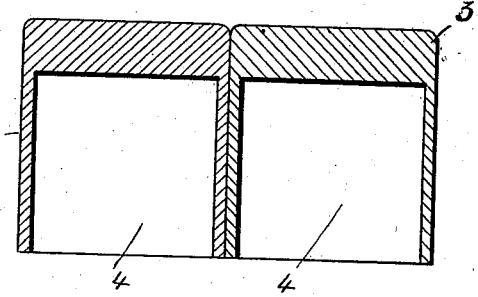
Figure 5:
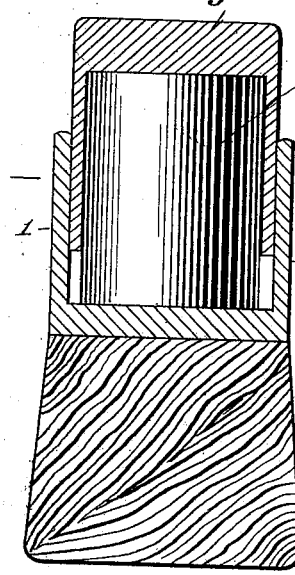
Figure 11:
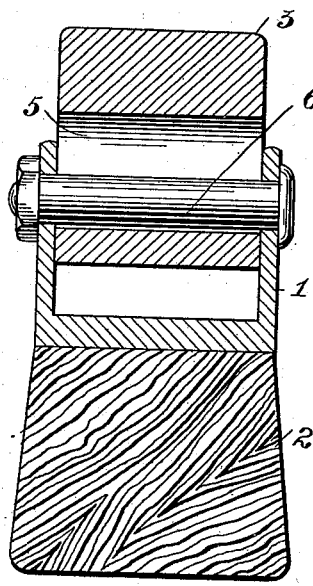
Figure 7:
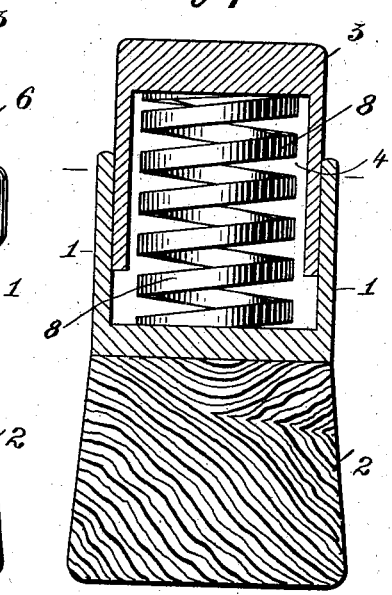
Figure 6:
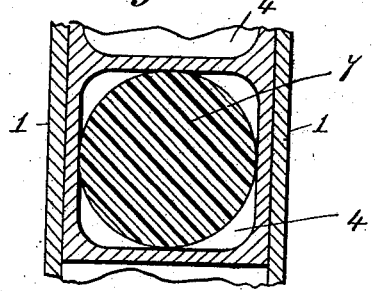
Figure 8:
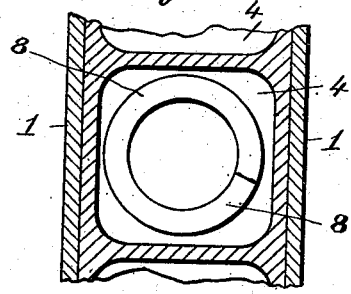
Figure 14:
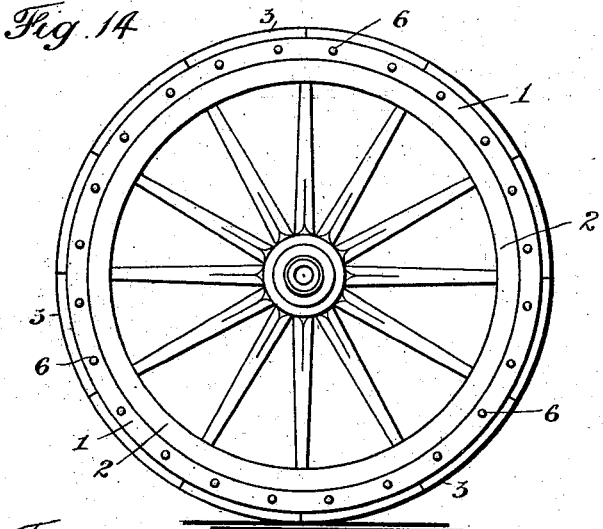
Figure 15:
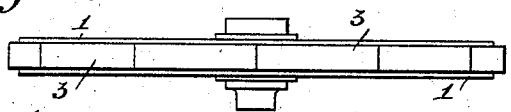
Figure 16:
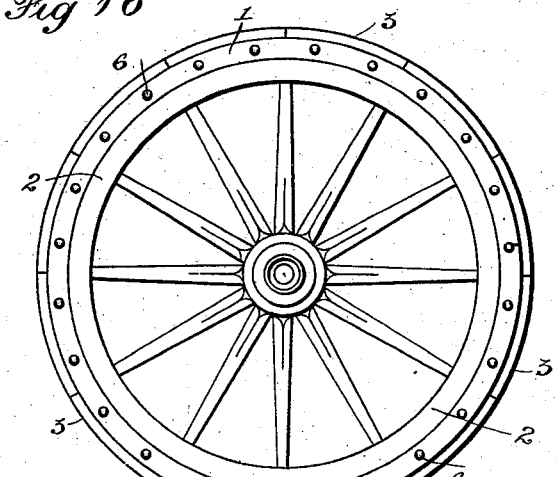
Figure 17:
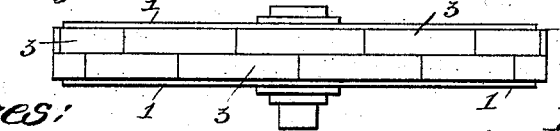

Figure 1 is a sectional elevation of a segment of a tire formed with boxes and with holes for connection to the rim. Fig. 2 is a section of a box through the line $a\,a$ of Fig. 1. Fig. 3 is a section of the hole-connection portion through $b\,b$ of Fig. 1. Fig. 4 is an under plan of the segment shown in Fig. 1. Fig. 5 is a section of a segment rim and felly with an india-rubber cushion in place. Fig. 6 is a sectional plan of same. Fig. 7 is a section of a segment rim and felly with a helical spring in place. Fig. 8 is a sectional plan of same. Fig. 9 is a section of a segment in which the boxes are formed side by side. Fig. 10 is a section with two separate segments placed side by side to form the tires. Fig. 11 is a section of a segment rim and felly through the bolt-holes. Fig. 12 is a sectional elevation of a segment, showing the arrangement of boxes when the segments are employed for a double tire and placed together alternately, as at Fig. 13. Figs. 14 and 15 are elevations and edge view of a complete wheel with the segment arranged in a single circle. Figs. 16 and 17 are elevation and edge view of a complete wheel with the segment arranged in a double circle.

For the purpose of my invention I employ the usual channeled rim 1 around the ordinary felly 2 of a wheel, and in this rim 1 I fix segments 3, having boxes 4, containing springs or rubber, said boxes 4 being in number in each segment 3 of the tire, the segments 3 being held to the channeled rim for resilient action of the springs and rubber cushions and to prevent creeping by providing certain of the webs between the boxes 4 with holes, as at Fig. 5. I employ a straight side rim 1 and segments 3, these having slots 5 arranged so that when such segments 3 are placed together in the rim 1 the insertion of a bolt 6 through the rim 1 and the slots 5 the segments 3 will be prevented leaving the rim 1, and at the same time all creeping is prevented. For heavy vehicles the segments 3 may be arranged in pairs across the rim, as at Figs. 10, 12, 13, 16, and 17, so as to produce a wide tread, the segments 3 being kept in place and prevented creeping by the above means. The boxes or segments may have metal plates applied to form the wearing-surface of the tire, such plates being removable at will. When a single circle of segments are employed, I prefer that the holes 5 be arranged in the web between each two end boxes and that there be four boxes between each hole, so that there will be two bolts 6 for each segment; but where a double circle be employed, as at Figs. 16 and 17, I prefer that there be a box on each side of the hole 5, so that there be four holes in each segment; but such number may be any multiple of four. In placing the rubber 7 and spring-cushions 8 in the boxes I prefer that the rubber cushions 7 be placed in the end boxes of each segment and the spring-cushions 8 in the others, so that the rubber cushions take up the first concussion of each segment, the pressure or strain being afterward conveyed to the helical springs. The rubber is of round or any other form.

What I claim, and desire to secure by Letters Patent, is—

1. In combination, a rim of a wheel provided with a peripheral channel, a plurality of segments mounted in said channel and each formed with a plurality of interiorly-arranged boxes, each of the segments further provided with openings, cushions arranged in each of the boxes of the segments, and means extending through the walls of the channel and through the openings of the segments for securing the latter to the rim.

2. The combination with the rim of a wheel provided with a peripheral channel, of a plurality of segments mounted in said channel and each formed with a plurality of interiorly-arranged boxes, each of the segments further provided with openings, rubber and spring cushions suitably mounted and arranged in the boxes of the segments, and means extending through the walls of the channel and through the openings of the segments for securing the latter to the rim.

In testimony whereof I have hereunto set my hand in presence of two subscribing witnesses.

WILLIAM EDWARD CARMONT.

Witnesses:
PERCY E. MATTOCKS,
HUGH HUGHES.